United States Patent [19]

Hrovat et al.

[11] Patent Number: 5,271,027
[45] Date of Patent: Dec. 14, 1993

[54] GAS DISCHARGE DEVICE CURRENT CONTROL CIRCUIT

[75] Inventors: Albert C. Hrovat, Shoreview; Peter N. Ladas, St. Paul, both of Minn.

[73] Assignee: Honeywell Inc., Minneapolis, Minn.

[21] Appl. No.: 963,776

[22] Filed: Oct. 20, 1992

[51] Int. Cl.$^5$ .................................................. H01S 3/00
[52] U.S. Cl. ........................................ 372/38; 372/94
[58] Field of Search ...................................... 372/38, 94

[56] References Cited

U.S. PATENT DOCUMENTS 4,967,417 10/1990 Yamada .................................. 372/38

Primary Examiner—Rodney B. Bovernick
Assistant Examiner—Robert E. Wise
Attorney, Agent, or Firm—Robert A. Pajak

[57] ABSTRACT

A low voltage comparator circuit is utilized for comparing the current flowing into and out of one of the electrodes of a gas discharge device with a preselected value. The comparator provides an output signal to an optical isolation means for generating light waves in response to the comparator means output. The optical isolation means includes a photosensitive means for providing an output signal which is responsive to the intensity of light waves generated by the light generating means. The output of the photosensitive means is electrically connected to an input means for a current control which includes a first terminating means electrically connected to the one electrode of the gas discharge device, and a second terminating means electrically connected to the high voltage supply.

2 Claims, 2 Drawing Sheets

GAS DISCHARGE DEVICE CURRENT CONTROL CIRCUIT

The present invention relates to current control circuits for gas discharge devices, and more particularly to a current control circuit which isolates low voltage circuitry from high voltage circuitry.

BACKGROUND OF THE INVENTION

Gas discharge devices commonly employ a pair of electrodes for passing an electrical current through the gas within a gas containing cavity and subsequently initiating a gas discharge. Such gas discharge devices are commonly employed in lasers. However, in laser applications, the electrical current passing through the gas is commonly controlled so as to establish appropriate characteristics of the laser beam. This is particularly important in ring laser gyros as those shown and described in U.S. Pat. No. 3,373,650, issued to Killpatrick, and U.S. Pat. No. 3,390,606, issued to Podgorski.

In the aforesaid ring laser gyro, commonly employed is a single cathode and a pair of anodes in which the total electrical current between each pair of electrodes must be held constant to within a fraction of a percent to prevent changes in what is referred to as the ring laser gyro output bias. Further, not only are the electrical currents between the cathode and each of the anodes maintained substantially equal, but the total current passing into and out of the cathode is held constant within a fraction of a percent to prevent changes also in the gyro output bias.

To achieve this goal in ring laser gyros, designers generally build high voltage supplies to overcome the large resistance of the gas discharge cavity, and then the electrical currents flowing into and out of the cathode is carefully measured using sensitive, precision components, and compared to a stable reference current or voltage. This comparison is then used to create an error signal which is then fed back to a high voltage current control circuit which is electrically connected to a high voltage electric potential source.

In operation, such circuits function so that if the current begins to deviate slightly from a desired amount, the error signal that is generated is sent back to the current control circuit to compensate, thereby forcing the current to be regulated.

In such systems it is important to translate the low voltage error signal provided from a low voltage measuring circuit to the high voltage current control circuit. Simple wire connections would allow dangerous high voltages to flow back to the low voltage measuring circuits and may subsequently damage them by exceeding their respective voltage ratings. In the prior art, a common solution has been to use several stages of transistors to isolate the high voltage circuitry from the low voltage measuring circuits.

SUMMARY OF THE INVENTION

An object of the present invention is to isolate the low voltage current measuring circuitry employed in a gas discharge device from the high voltage current control circuitry in gas discharge devices and, more particularly, to ring lasers employed in ring laser gyros.

In the present invention a low voltage comparator circuit is utilized for comparing the current flowing into and out of one of the electrodes of a gas discharge device with a preselected value. In turn, the comparator provides an outputs signal to an optical isolation means for generating light waves in response to the comparator means output. In turn, the optical isolation means includes a photosensitive means for providing an output signal which is responsive to the intensity of light waves generated by the light generating means. The output of the photosensitive means in turn is electrically connected to an input means for a current control which includes a first terminating means electrically connected to the one electrode of the gas discharge device, and a second terminating means electrically connected to the high voltage supply.

DETAILED DESCRIPTION OF THE INVENTION

Figure 1:
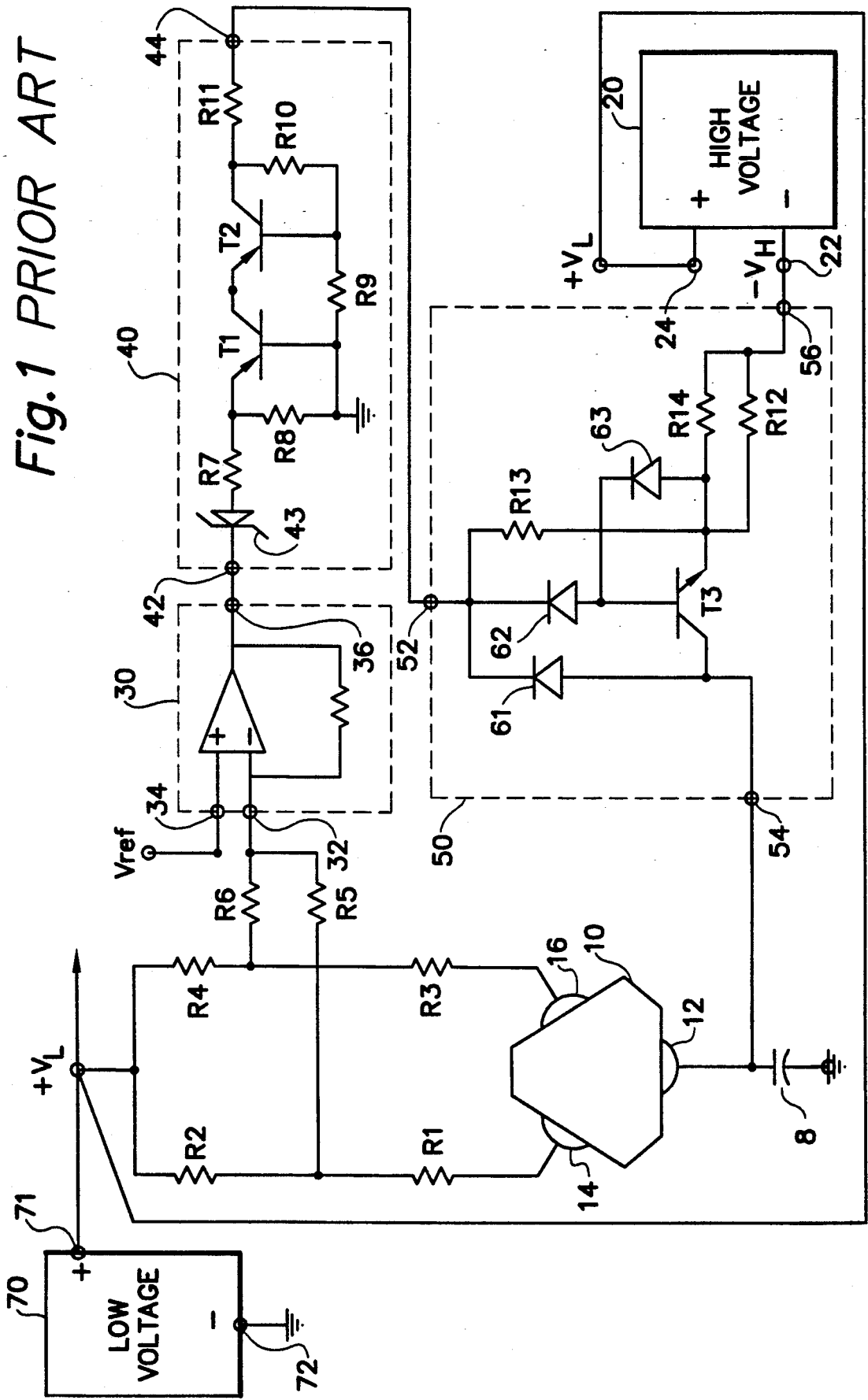
FIG. 1 is a schematic diagram of a current control circuit of the prior art.

Shown in FIG. 1 is a schematic diagram showing a current control circuit for a ring laser gyro of the prior art. Thereshown is a gas discharge device 10 in the form of a ring laser gyro as particularly described in U.S. Pat. No. 3,373,650, issued to Killpatrick, and U.S. Pat. No. 3,390,606, issued to Podgorski. As is well understood in the ring laser gyro art, a block is provided for containing a gas. A plurality of electrodes are in communication with the gas in order to pass a discharge current therethrough and subsequently produce a pair of counter-propagating laser beams travelling along an optical closed-loop path. Referring particularly now to the drawing of FIG. 1, the gas discharge device includes a first electrode 12 electrically connected to the negative polarity terminating means 22 of high voltage electric potential source 20. Further, a gas discharge device 10 includes a second electrode 14 electrically connected to the positive polarity terminating means 24 of high voltage electric potential source 20 through series resistors R1 and R2. Similarly, electrode 16 is electrically connected to the positive polarity terminating means 24 of high voltage electrical potential source 20 through resistors R3 and R4. By virtue of the electrical connection of electrodes 14 and 16 to the positive polarity terminating means 24, electrodes 14 and 16 become the anodes of gas discharge device 10, and electrode 12 is the cathode.

Also illustrated in FIG. 1 is a low voltage power supply 70 having a positive low voltage output, designated 71, and also as $+V_L$, and a negative low voltage output 72 connected to circuit ground. The positive low voltage output 71 is electrically connected to the junction of resistors R2 and R4 as well as other circuit components, for example operational amplifier 30 (not shown) to provide low voltage circuit power. Also, the positive polarity output 71 is also electrically connected to the positive polarity terminating means 24 in order to provide a complete electrical control circuit.

The junction of resistors R1 and R2 is electrically connected to an input means 32 of a comparator means 30 through resistor R5. The junction of resistors R3 and R4 is also electrically connected to input means 32 through resistor R6. Comparator means 30 is schematically shown as a summing amplifier having the negative input thereof being input means 32, and the positive input thereof being electrically connected to an electric potential designated as $V_{ref}$. Comparator means 30 includes output means 36 which is proportional the voltage difference between input means 34 and 32.

The comparator 30 output means 36 is electrically connected to input means 52 of current control circuit 50 through an electrical isolation circuit 40 including input terminating means 42 and output terminating means 44. Electrical isolation circuit 40 includes a pair of transistors T1 and T2 connected in series, and resistors R7, R8, R9, R10 and R11. Zener diode 43, and resistors R7 and R8 form a biasing arrangement for transistors T1 and T2. Resistors R9, R10 and R11 are generally high resistance values in the megohm range. As will more fully be described, electrical isolation circuit 40 essentially isolates the low voltage circuit at the output 36 of comparator 30 from the high voltage current control circuit 50.

Current control circuit 50 includes a transistor T3 having collector thereof electrically connected to electrode 12, and the emitter thereof electrically connected to negative polarity terminating means 22 through limiting resistor R12. Current control circuit 50 also includes a transistor biasing arrangement and isolation circuit including diodes 61, 62 and 63 and resistors R13 and R14.

The circuit operation of FIG. 1 will now briefly be described. The input signal electrically connected to the input means 32 of comparator means 32 represents the total electrical current passing into and out of electrode 12. In turn, the output means 36 of comparator 30 provides a command signal representative of the difference in voltages between input means 32 and 34 as aforesaid. In turn, the command signal is electrically connected to input means 52 of current control circuit 50 through the electrical isolation circuit 40 for controlling the current passing through transistor T3 and into and out of current control circuit terminating means 54. In closed-loop operation, as should be well understood to those skilled in the art, the combination of comparator means 30 and current control circuit 50 serve to maintain a constant electrical current passing into and out of electrode 12.

As indicated earlier, fault tolerant system designs require isolation of failures as an aspect of their architecture. A transistor level shifter, like those shown in the isolation circuit 40, have a failure mode in which the transistors may short, allowing high voltage to pass through them. In turn, this may cause catastrophic failure to low voltage circuits and other circuits common to an electrical board, in which in turn may cause catastrophic failure to the entire system. In the present invention, an optical isolation technique is employed to avoid a potential for catastrophic failure due to transistor short-circuits.

Figure 2:
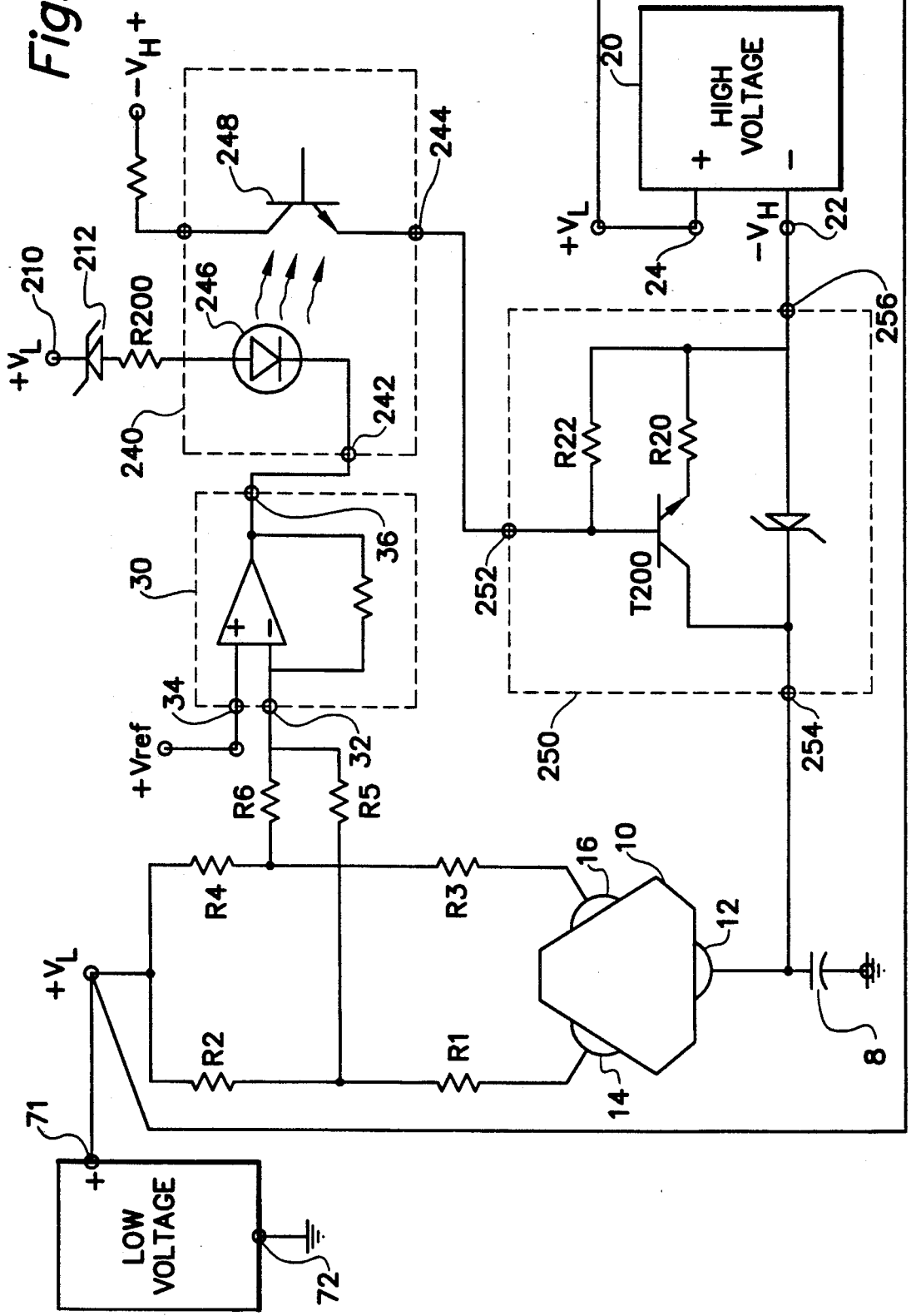
FIG. 2 is a current control circuit in accordance with the present invention.

Shown in FIG. 2 is essentially the circuit of FIG. 1 with the electrical isolation circuit 40 replaced by electrical isolation circuit 240, and the current control circuit 50 replaced by current control circuit 250. In FIG. 2, thereshown are circuit components of FIG. 1 with similarly functioning and arranged circuit components in FIG. 2 having the same numeral designations as in the previously described figure.

Now referring more particularly to FIG. 2, thereshown is an optical isolation means 240 having a signal input means 242 and a signal output means 244. Optical isolation means includes a light generating means illustrated as a light emitting diode 246 for producing light waves having an intensity in response to a command signal electrically coupled to the signal input means 242.

Further, optical isolation means 240 also includes a photosensitive means illustrated as a photosensitive transistor 248 having the emitter thereof electrically connected to signal output means 244.

Optical isolation means 240 further includes a current biasing arrangement including a current supply means illustrated as and including a supply voltage $V_L$ connected to terminating means 210 and also zener diode 212 in series with resistor R200.

The collector of photosensitive transistor 248 is electrically connected to a negative supply voltage substantially equal to that at the negative polarity terminating means 22 plus an additional positive voltage value $V_p$, e.g., +20 volts.

Current control means 250 includes control transistor T200 having the collector thereof connected to a first output terminating means 254, which in turn is electrically connected to electrode 12. The emitter of transistor T200 is electrically connected to the negative polarity terminating means 22 through current limiting resistor R20 and second output terminating means 256. Transistor T200 further includes a biasing resistor R22 between the base of transistor T200 and output terminating means 256.

The circuit operation of FIG. 2 in accordance with the present invention will no be described. As before, the output terminating means 36 of comparator 30 provides an output signal representative of the difference in voltage between voltage signals at the inputs 32 and 34. The output terminating means 36 being electrically connected to the input means 242 of optical isolation means 240 substantially controls the current passing through the light emitting diode 246. In turn, transistor 248 provides an electrical current into and out of terminating means 244 which is a function of the light intensity generated by the light emitting diode 246.

In turn, by virtue of output means 244 of optical isolation means 240 being electrically connected to the current control input means 252, the current passing through transistor T200 is regulated in response to the current into and out of input means 252.

Therefore, the circuit of FIG. 2 functions in a similar manner to FIG. 1 for maintaining the current passing into and out of electrode 12 to a constant value as determined by the reference voltage provided at the input means 34 of comparator means 30. However, by virtue of the optical isolation means 240, the high voltage circuit is electrically isolated from the low voltage circuit. This in turn provides a circuit which obviates the catastrophic breakdown of a transistor short due to high voltages as was the case in the prior art with use of the transistor isolation circuit 40 of FIG. 1.

Those skilled in the art will recognize that only a preferred embodiment of the present invention has been disclosed herein and that the embodiments thereof may be altered and modified without departing from the true spirit and scope of the invention as defined in the accompanying claims.

More specifically, although the circuit is particularly applicable to ring laser gyros, the circuit is also applicable to any gas discharge device in which it is intended to isolate the low voltage from the high voltage circuits which power the gas discharge device. Further, there are a wide variety of packaged, so called, "opto-isolator" circuits for providing optical isolation means 240, and are all intended to be within the scope of the present invention and accompanying claims.

The embodiments of an invention in which an exclusive property or right is claimed are defined as follows:

1. A current control circuit for a gas discharge device wherein said gas discharge device includes at least first and second electrodes electrically connected to first and second polarity terminating means, respectively, of a high voltage electric potential source for passing an electrical current between said first and second electrodes, said current control circuit comprising:
    optical isolation means having,
        signal input means and signal output means,
        light generating means for producing light waves having an intensity in response to a second command signal electrically couple to said signal input means, and
        photo sensitive means for providing an output signal at said signal output means in response to said intensity of said light waves;
    current control means having a control signal input means, and first and second terminating means, said control means operative for controlling the current passing into and out of said first terminating means in response to a first command signal electrically coupled to said command signal input means, said first terminating means electrically connected to said first electrode of said gas discharge device, said second terminating being electrically connected to said first polarity terminating means of said high voltage electric potential source, and said command signal input means electrically couple to said output means of said optical isolation means; and
    comparator means for comparing the current into and out of said first electrode with a preselected current value and for providing said first command signal indicative of the difference of said currents.

2. A current control circuit for a ring laser wherein said ring laser includes at least a first electrode electrically connected to a first polarity terminating means of a high voltage electric potential source, and second and third electrodes electrically connected to a second polarity terminating means of said high voltage electric potential source, for passing an electrical current between said first electrode and each of said second and third electrodes, said current control circuit comprising:
    optical isolation means having,
        signal input means and signal output means,
        light generating means for producing light waves having an intensity in response to a second command signal electrically couple to said signal input means, and
        photo sensitive means for providing an output signal at said signal output means in response to said intensity of said light waves;
    current control means having a control signal input means, and first and second terminating means, said control means operative for controlling the current passing into and out of said first terminating means in response to a first command signal electrically coupled to said command signal input means, said first terminating means electrically connected to said first electrode of said gas discharge device, said second terminating being electrically connected to said first polarity terminating means of said high voltage electric potential source, and said command signal input means electrically couple to said output means of said optical isolation means; and
    comparator means for comparing the current into and out of said first electrode with a preselected current value and for providing said first command signal indicative of the difference of said currents.

* * * * *